Figure 1:
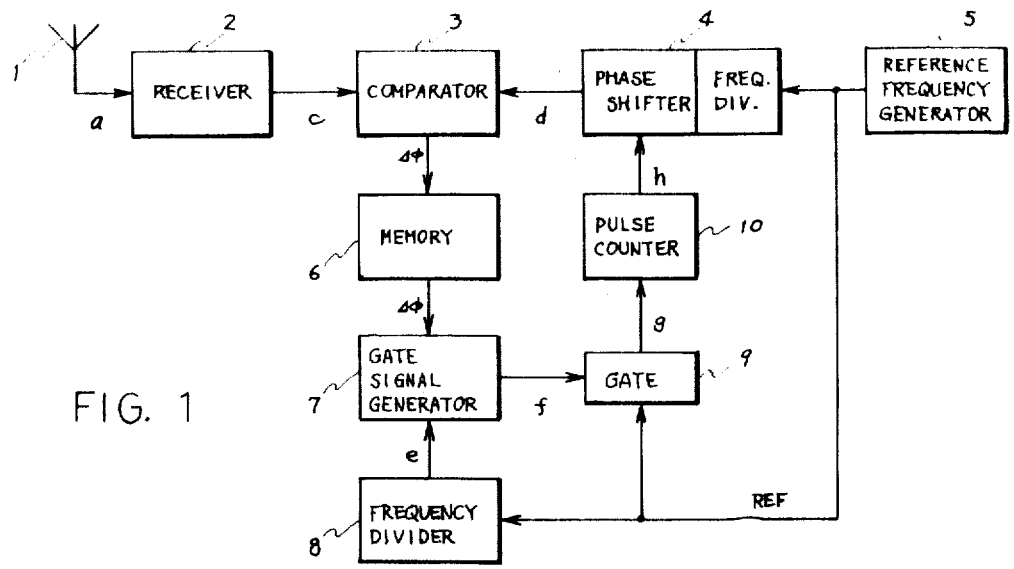

United States Patent [19]
Ichihara et al.

[11] 3,789,408
[45] Jan. 29, 1974

[54] SYNCHRONOUS SYSTEM

[75] Inventors: Koji Ichihara, Neyagawa; Hideki Tanaka, Takatsuki; Kazutaka Ishida, Suita; Minoru Handa, Nishinomiya, all of Japan

[73] Assignee: Furuno Electric Company, Limited, Nagasaki-ken, Japan

[22] Filed: May 15, 1972

[21] Appl. No.: 253,000

[30] Foreign Application Priority Data
May 27, 1971 Japan.............................. 46/36836

[52] U.S. Cl........... 343/105 R, 325/83 EF, 343/103
[51] Int. Cl............................................. G01s 1/30
[58] Field of Search .... 343/105 R, 10 B; 324/83 FE

[56] References Cited
UNITED STATES PATENTS
3,573,828  4/1971  Hawley ........................... 343/105 R
3,689,925  9/1972  Hulland........................... 343/105 R Primary Examiner—Maynard R. Wilbur
Assistant Examiner—Richard E. Berger

[57] ABSTRACT

Means for measuring time or phase differences between incoming segmented signals which includes the generation of a segmented reference signal having the same frequency of the incoming signals. A comparator for comparing the phase difference between an incoming signal and the reference signal and means for storing the detected phase difference. Means for producing a control pulse train for dividing said phase difference into n parts where n is the number of segments used for detecting said phase difference and then shifting the phase of each segment of the reference signal by $1/n$ for each pulse of the control pulse train.

4 Claims, 4 Drawing Figures

SYNCHRONOUS SYSTEM

This invention relates to a novel and improved synchronizing system which is particularly useful for measuring time differences or phase differences between pairs of incoming signals.

Devices such as loran and omega receivers which are adapted to measure a time or phase difference between a pair of incoming signals to find the position of a navigating body are arranged to generate within the device a pair of waves which are respectively synchronous with the incoming signals and then measure the time or phase difference between these two generated synchronous waves. When the incoming signals are received by the navigating body, such as an aeroplane moving at a high speed, the incoming signals are subjected to Doppler effects and, therefore, the period of the internally generated synchronous waves must be corrected or compensated by a quantity corresponding to the Doppler effect.

In the omega navigating system, for instance, a plurality of transmitting stations transmit signals at the same frequency in time division fashion. Therefore, in order to compare a pair of signals from two transmitting stations and measure the phase difference therebetween it is necessary to store or hold one signal until the other signal is received. One prior way for effecting the above procedure is to compare the phase of one signal with a synchronous wave which is produced by frequency division of a reference signal which is a higher harmonic thereof and then storing the phase difference as an electric charge in a capacitor. The capacitor charge is then converted into a capacitance by utilizing a variable capacitance diode or the like and the frequency of the reference frequency generator is controlled so that the synchronous wave has the same phase as the incoming signal. In the case of the omega receiver, however, a number of reference frequency generators must be provided because a number of synchronous waves corresponding to the various station signals must be processed individually. As the reference frequency generators must have a very high accuracy, this results in a very expensive system. Moreover, when the reference frequency is varied it cannot be used as a time reference for measuring a time or phase difference of incoming signals. Further, by controlling the frequency of the reference generator based on the detected magnitude of the Doppler effect, it may be dfficult to cause the period of the synchronous wave to follow the speed of the navigating body.

Accordingly, an object of this invention resides in the provision of an improved synchronizing system based upon a novel principle in which a number of synchronous waves are generated from a single common reference frequency generator and these synchronous waves are caused respectively to follow the respective signals transmitted from a number of transmitting stations.

According to this invention, the synchronizing system includes a receiver for receiving the incoming signals, a reference frequency generator for generating a reference signal having a constant frequency, a frequency divider for dividing the frequency of said reference signal to produce a synchronous wave having the same frequency as said incoming signals, a comparator for comparing said synchronous wave with the earlier incoming signal to detect a phase difference therebetween, means for storing said detected phase difference for the period from one signal to the next signal, means for producing a control pulse train which equally divides the time difference into n parts, with n being proportional to said detected phase difference, and means for shifting the phase of said synchronous wave by $1/n$ of said detected phase difference during each application of said control pulse train whereby the phase difference is cancelled before the next signal is received.

Other objects and features of this invention will be described hereinunder in further detail with reference to the accompanying drawings which illustrate the application of the invention to an omega receiving system.

Figure 2:
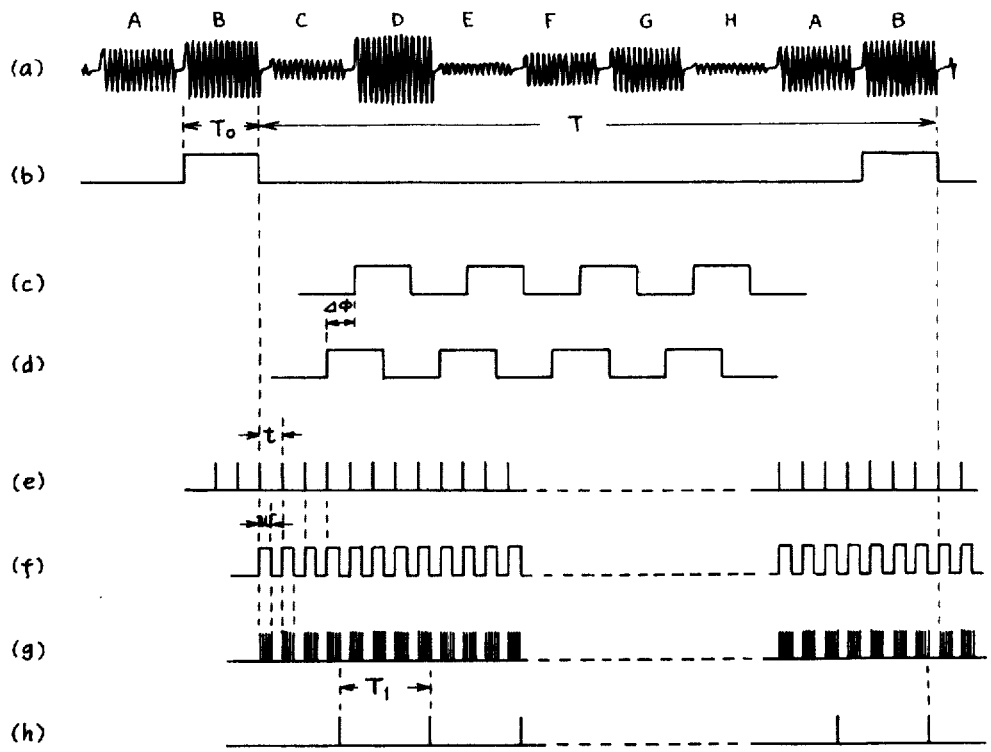
Figure 3:
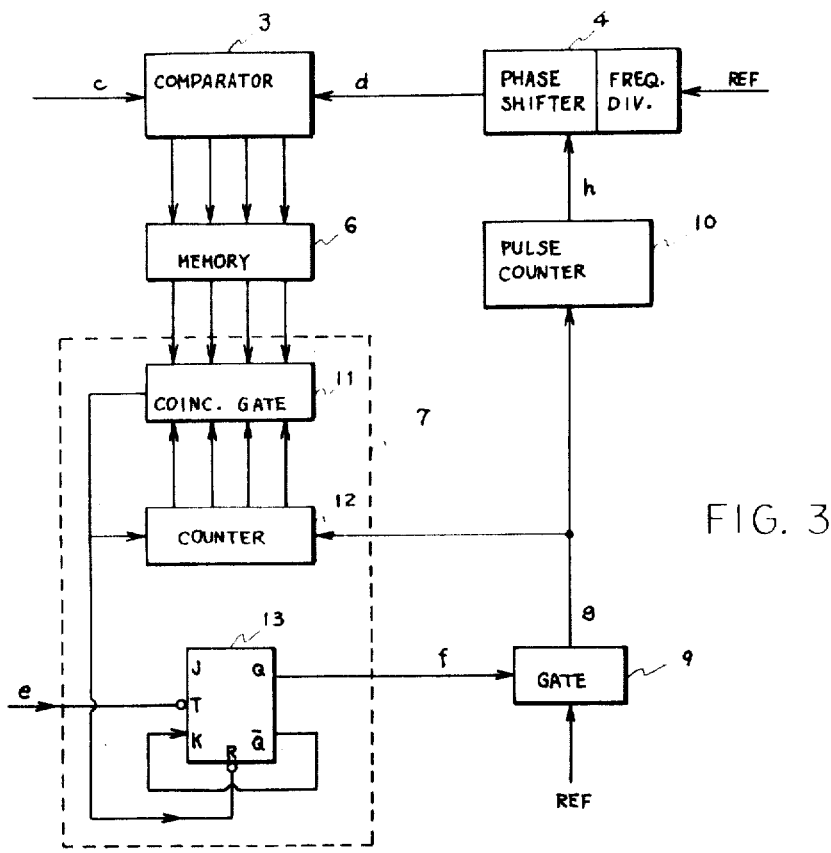
Figure 4:
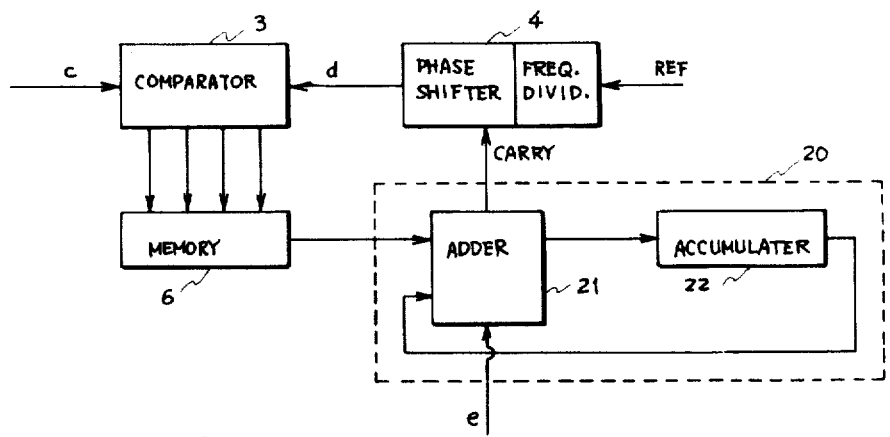

In the drawings:

FIG. 1 is a block diagram representing an embodiment of the system of this invention, FIG. 2 is a waveform diagram representing several waveforms produced in the system of FIG. 1 to facilitate an understanding of the operation of the system, FIG. 3 is a block diagram representing an embodiment of the gate signal generator in the system of FIG. 1, and FIG. 4 is a block diagram representing another embodiment of the system of this invention.

Throughout the drawings like reference numerals are used to denote like structural components.

Now, referring to FIG. 1, the omega receiving system includes an omega receiver 2 provided with an antenna 1, a comparator 3, a frequency divider and phase shifter 4 and a reference frequency generator 5. The system further includes a memory 6, a gate signal generator 7, a frequency divider 8, a gate 9 and a pulse counter 10 which form, in combination, a novel synchronizing system of this invention.

Operation of the system of FIG. 1 will now be described with reference to FIG. 2 including various waveforms. As is well known in this field, the omega receiver 2 receives a signal a from the antenna 1 which includes a plurality of waves A,B,C,D,E,F,G and H, for example, transmitted respectively from eight transmitting stations in time division fashion at the same frequency. As each transmitting station is arranged to transmit its wave for a short time $T_0$ such as 0.9 to 1.2 seconds during each time period T such as 10 seconds, the wave from the same station appears repeatedly at time intervals T. Therefore, the wave transmitted from any desired station can be trapped in the receiver 2 by a switching wave b having a period T and a duration $T_0$. As an example, the drawing shows that the wave B is trapped. The received wave B is then amplified and shaped in the receiver 2 to produce a square waveform c.

In addition, a reference clock pulse train REF is generated in the reference frequency generator 5 and frequency-divided by the frequency divider 4 to form a synchronous wave having the same frequency as the incoming wave B. This synchronous wave is then shaped to form a square wave d having the same waveform as the wave c. The waves c and d are applied to the comparator 3 and compared in phase and a detected $\Delta\phi$ is temporarily stored in the memory 6. The phase difference information $\Delta\phi$ is then applied to the gate signal generator 7.

The reference frequency pulse train REF is further applied to the frequency divider 8 to form a clock pulse train e having a constant period $t$. The period $t$ of the pulse train $e$ may be arbitrary but is preferably selected to be one hundredth of the period T of the switching signal $b$. For example, it may be 0.1 second when T is 10 seconds.

The gate pulse generator 7 receives the clock pulse $e$ from the frequency divider 8 and the phase difference signal $\Delta\phi$ from the memory 6 and produces a gate signal $f$ which has a period $t$ equal to that of the clock pulse $e$ and a duration $w$ proportional to the phase difference $\Delta\phi$. This gate signal is applied as a control signal to the gate circuit 9 to open it for each time period corresponding to the duration $w$ thereof, whereby the reference clock pulse train REF is intermittently passed through the gate 9 to form an output waveform as shown at $g$ in the drawing.

The wave $g$ is applied to the pulse counter 10. The pulse counter 10 is arranged to produce a pulse each time a predetermined number of pulses N are received. Therefore, if a number of reference frequency pulses $m$ are included within the duration $w$ of the waveform $f$, the period $T_1$ of the pulse train $h$ produced by the pulse counter 10 is $t(N/m)$, then a number of pulses $n$ will be produced by the pulse counter 10 during the period T of the switching signal $b$, where $n = T/T_1 = Tm/tN$. Since, T, $t$ and N are previously selected and fixed, $n$ is proportional to $m$ which is further proportional to the duration $w$ which is proportional to the phase difference $\Delta\phi$, so that $n$ is perfectly proportional to $\Delta\phi$.

Therefore, if the phase shifter 4 is previously arranged so as to shift the phase of the input wave by $\Delta\phi/n$ each time the pulse $h$ is received, the phase difference $\Delta\phi$ is completely compensated during the period T, that is, before the next incoming signal B is received by the receiver 2. When the phase difference is K$\Delta\phi$ where K is an arbitrary constant, $\Delta\phi/n$ phase shift is carried out K$n$ times during the period T to compensate the K$\Delta\phi$ phase difference. Though the phase shift operation in the phase shifter 4 can be effected by utilizing any of the known techniques, it is conventiently effected by sampling and then subtracting or adding a specific number of pulses from or to the clock pulses produced by the frequency divider each time a pulse $h$ is received.

Assuming that $T = 10$ seconds, $t = 0.1$ second, $N = 100$, $m = 5$ and the synchronous wave $d$ gains $\Delta\phi$ in phase with respect to the incoming wave $c$, then, as an example, a pulse $h$ is produced for every 20 pulses of $g$, that is, every 2 seconds and, accordingly, five pulses $h$ are produced from the pulse counter 10. Therefore, the phase of the synchronous wave $d$ is delayed five times by an amount $\Delta\phi/5$.

If the detected phase difference is 2$\Delta\phi$, the phase shift is carried out 10 times by the same amount $\Delta\phi/5$ each time. Thus, if the amount of phase shift to be effected each time in the phase shifter 4 is once calibrated with some phase difference, any amount of phase difference detected by the comparator 3 can be completely corrected before the next desired signal comes into the receiver 2 and any Doppler effect is automatically cancelled.

As is evident from the above, the reference frequency generator 5 is fully independent of the phase shifting operation of the system. Accordingly, it can be noted also that a single reference frequency generator is sufficient for phase detection of any pair of incoming signals because it can be utilized in common with a plurality of like synchronizing systems which process different synchronous waves.

Now, the gate signal generating operation executed in the gate signal generator 7 will be described in detail with reference to the arrangement of FIG. 3 as an example.

In FIG. 3 the gate signal generator 7 includes a coincidence gate 11, a counter circuit 12 and a JK-flip-flop 13. In this case, the comparator 3 has a counter circuit consisting of flip-flops arranged in a plurality of stages for digitally counting the phase difference $\Delta\phi$. The memory circuit 6 also includes the same number of stages of flip-flops as the counter circuit of the comparator 3, and the memory operation is effected by coinciding the state of each flip-flop of the memory circuit with that of each corresponding flip-flop in the comparator.

Furthermore, the clock pulse $e$ produced by the frequency divider 8 is applied to the trigger terminal T of the JK-flip-flop 13 to turn the terminal Q from low level to high level. As the terminals $\overline{Q}$ and K are connected together, the terminal Q is never turned back to low level unless the flip-flop is reset. At the high level of the terminal Q, the gate circuit 9 is driven into conduction to pass the reference clock pulses REF from the reference frequency generator 5. The output pulses $g$ of the gate circuit 9 are applied to the pulse counter 10 and, at the same time, counted by the pulse counter 12 in the gate pulse generator 7. The counter 12 is composed of cascaded flip-flops of the same number of stages as the memory circuit 5 and the output of each flip-flop is compared in the coincidence gate circuit 11 with the content of each corresponding flip-flop in the memory 5.

The coincidence gate 11 is adapted to produce an output when the corresponding pairs of flip-flops of both memory circuit 6 and counter circuit 12 are in the same states, respectively, at the same time, that is, when the numerical value (phase difference) stored in the memory 6 coincides with the numerical value (count) in the counter circuit 12. The output of the coincidence gate 11 is applied to the counter circuit 12 to reset it and, at the same time, to the reset terminal R of the JK-flip-flop 13 to reset it. When the flip-flop 13 is reset, the terminal Q is turned to its low state and the gate circuit 9 becomes non-conductive to block the reference clock pulses REF. As understood from the above, the flip-flop 13 produces a pulse which appears at each application of the clock pulse $e$ from the frequency divider 8 and continues for a period $w$ corresponding to the phase difference $\Delta\phi$ stored in the memory 6 as shown at $f$ of FIG. 2.

In the above operation, the phase difference is indicated as the number of clock pulses and the number of clock pulses is accumulated. The same operation can be effected by indicating the phase difference as a binary code and adding a binary code at every occurrence of the clock pulse $e$ from the frequency divider 8. This system will be described with reference to FIG. 4.

In the system of FIG. 4, the blocks 7, 9 and 10 of FIG. 1 are substituted by a single arithmetic unit 20 including an adder 21 and an accumulator 22. In this case, the phase difference $\Delta\phi$ is stored in the memory 6 as a binary code, for example, 0011 when $\Delta\phi = 3$. The binary code is applied from the memory 6 to one input of the adder 21. The other input of the adder 21 is supplied with the output of the accumulator 22 having an input connected to the output of the adder 21. The third input of the adder 21 is the clock pulse $e$ supplied from the frequency divider 8. The adder 21 successively adds the output of the memory 6 to the output of the accumulator 22 each time the clock pulse $e$ is applied, as shown in Table 1 wherein the phase difference $\Delta\phi$ is illustrated as 3, i.e., 0011. When the most significant digit turns from 1 to 0, a "carry" pulse is produced by the adder 21 and applied to the phase shifter 4 as the control pulse $h$. As is evident, the interval of this "carry" pulse is inversely proportional to the magnitude of $\Delta\phi$ and, therefore, the number thereof included within the period of the switching signal $b$ is proportional to the phase difference. Therefore, the train of "carry" pulses is equivalent to the pulse train $h$ in the system of FIGS. 1 and 3.

The above embodiments are shown only for the purpose of illustration and various modifications and variations can be made without departing from the scope of this invention as defined by the appended claims. The circuit configurations included in the respective blocks in the drawings are believed to be well known to those skilled in the art. Moreover, though the above description refers to the omega receiving system, this invention is equally applicable to loran and like systems.

What is claimed is:

1. A synchronizing system in a device for measuring the phase difference between a pair of incoming signals having the same frequency and occurring at a predetermined time difference each of said signals being repeated at predetermined intervals, comprising a receiver for receiving said signals, a reference frequency generator for generating reference signal having a constant frequency, a frequency divider for dividing the frequency of said reference signal to produce a synchronous signal having the same frequency as said incoming signals and a comparator for comparing said synchronous signal with the earlier incoming signal to detect a phase difference therebetween, means for storing said detected phase difference until the later incoming signal is received, means for producing a control pulse train which equally divides the period of said time difference into $n$ parts wherein $n$ is proportional to said detected phase difference, and means for shifting the phase of said synchronous signal by $1/n$ of said detected phase difference at the time of application of said control pulse train whereby the phase difference is cancelled before the later incoming signal is received.

2. A synchronizing system according to claim 1 wherein said means for producing a control pulse train comprises a second frequency divider for dividing the frequency of said reference signal to produce a clock pulse train, a gate pulse generator for generating a gate pulse train having a period equal to that of said clock pulse and a pulse duration proportional to said detected phase difference under control of the output of said storage means and said clock pulse train, a gate circuit for gating said reference signal under control of said gate pulse train, a pulse counter for counting pulses of the output of said gate circuit and producing a pulse each time a predetermined count is attained, and a phase shifter for shifting said synchronous signal in phase by a predetermined amount each time an output pulse is produced by said pulse counter.

3. A synchronizing system according to claim 2 wherein said gate signal generator includes a counter for counting the output pulses of said gate circuit, a coincidence gate for comparing the count of said counter circuit with the content of said storage means and producing an output when they coincide with each other, a JK-flip-flop triggered by the clock pulse from said frequency divider and reset by the output of said coincidence gate, said counter circuit being also reset by said output of the coincidence gate and the output of said JK-flip-flop being applied to said gate circuit as the gate pulse.

4. A synchronizing system according to claim 1 wherein said means for producing a control pulse train comprises an adder and an accumulator, said adder being interconnected with said accumulator to accumulate the content of said storage means under control of said clock pulse from said frequency divider and produce a "carry" signal and means feeding said "carry" signal to said phase shifter as the control pulse.

* * * * *